(12) United States Patent
Tillman

(10) Patent No.: US 9,209,991 B1
(45) Date of Patent: Dec. 8, 2015

(54) AD HOC NETWORKING

(75) Inventor: Christopher A. Tillman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 679 days.

(21) Appl. No.: 13/247,055

(22) Filed: Sep. 28, 2011

(51) Int. Cl.
*H04L 12/54* (2013.01)

(52) U.S. Cl.
CPC .................................. *H04L 12/5695* (2013.01)

(58) Field of Classification Search
CPC .......................... H04L 47/70; G06F 17/3089
USPC ........... 709/235, 242; 370/235, 401, 254, 252
See application file for complete search history.

(56) References Cited

U.S. PATENT DOCUMENTS

| | | | | |
|---|---|---|---|---|
| 7,639,619 | B2 * | 12/2009 | Xu | 370/235 |
| 7,760,745 | B2 * | 7/2010 | Qureshi et al. | 370/401 |
| 2003/0204616 | A1 * | 10/2003 | Billhartz et al. | 709/235 |
| 2005/0060425 | A1 * | 3/2005 | Yeh et al. | 709/232 |
| 2006/0285489 | A1 * | 12/2006 | Francisco et al. | 370/229 |
| 2007/0104215 | A1 * | 5/2007 | Wang et al. | 370/458 |
| 2007/0211624 | A1 * | 9/2007 | Schmidt et al. | 370/225 |
| 2007/0297388 | A1 * | 12/2007 | Appaji et al. | 370/351 |
| 2010/0195535 | A1 * | 8/2010 | Ziller et al. | 370/254 |
| 2011/0019669 | A1 * | 1/2011 | Ma et al. | 370/389 |
| 2011/0134765 | A1 * | 6/2011 | Rector et al. | 370/252 |

OTHER PUBLICATIONS

"Wi-Fi Certified Wi-Fi Direct™: Personal, portable Wi-Fi® technology," white paper, Wi-Fi Alliance®, Oct. 2010 (14 pages).
Griffith, E., "New 'Wi-Fi Direct' Spec Revamps Device Networks," last accessed on Oct. 26, 2012 on the world wide web at http://www.pcmag.com/article2/0,2817,2354201,00.asp, dated Oct. 14, 2009 (2 pages).

* cited by examiner

*Primary Examiner* — Thuong Nguyen
(74) *Attorney, Agent, or Firm* — McDonnell Boehnen Hulbert & Berghoff LLP

(57) ABSTRACT

Embodiments disclosed herein relate to ad hoc networking. An embodiment includes computing a routing score for a source node based on at least hardware capabilities of the source node, applications available to the source node, and networking capabilities of the source node. The embodiment further includes receiving at the source node, one or more routing scores from intermediate nodes directly or indirectly connected to the source node, and sending the data to the destination node based on at least the routing scores received from each intermediate node and one or more route paths associated with each intermediate node.

11 Claims, 10 Drawing Sheets

AD HOC NETWORKING

BACKGROUND

1. Field

Embodiments generally relate to computer networking.

2. Background Discussion

The Internet is considered to be a communication backbone for private, public, academic, business, and government networks, of local to global scope. Connecting to the Internet and other similar communication infrastructures has become a necessity.

Conventional networks rely on a number of gateway servers, wired access points or wireless hotspots to enable users to connect to the Internet. These servers are generally maintained and operated by Internet Service Providers (ISPs). When user access to a gateway server is affected, users are unable to connect to the Internet or other similar communication networks. This prevents a user from conveniently and rapidly communicating with other users. Furthermore, conventional networking techniques generally utilize cabling (e.g., copper cabling) leading to increased network infrastructure costs when creating new networks. Such cable-based infrastructure also tends to limit geographical areas serviced by networks.

BRIEF SUMMARY

Embodiments relate to ad hoc networking. One innovative aspect of the subject matter described includes a method including computing a routing score for a source node based on at least hardware capabilities of the source node, applications available to the source node, and networking capabilities of the source node. The embodiment further includes receiving at the source node, one or more routing scores from intermediate nodes directly or indirectly connected to the source node, and sending the data to the destination node based on at least the routing scores received from each intermediate node and one or more route paths associated with each intermediate node.

The method further comprises instantiating a communication module on the source node, the communication module configured to perform the computing, the receiving, and the sending, where the communication module may communicate with other communication modules to establish and maintain an independent ad hoc network adaptable to changing network conditions. In an embodiment, the routing score can also be based on a magnitude of contiguous node(s) and quality of transmission media.

Other embodiments of this aspect include corresponding systems, apparatus, and computer programs, configured to perform the actions of the methods, encoded on computer storage devices.

Further embodiments, features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
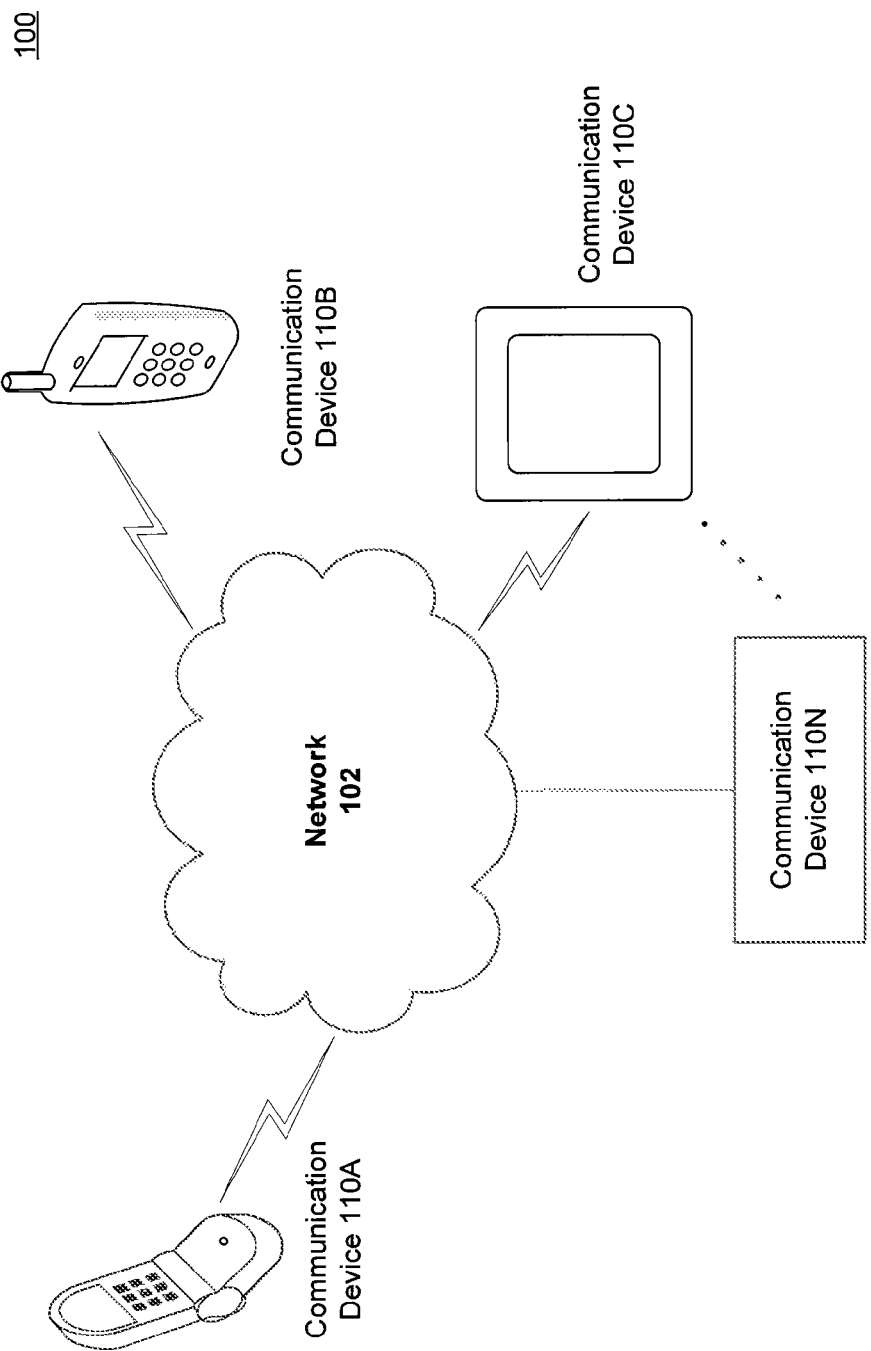
FIG. 1 illustrates an example network environment.

Embodiments relate to ad hoc networking. As discussed above, an embodiment includes computing a routing score for a source node, where the source node represents a communication device in a graph comprising nodes representing communication devices. In one embodiment, the routing score is based on at least hardware capabilities of the source node, applications available to the source node (e.g., installed applications), networking capabilities of the source node, a magnitude (or number) of contiguous node(s) and quality of transmission media. As a non-limiting example, contiguous nodes are nodes which are in direct contact (or in proximity) with each other or a given node.

The embodiment further includes receiving at the source node, one or more routing scores from intermediate nodes directly or indirectly connected to the source node, and sending the data to the destination node based on at least the routing scores received from each intermediate node and one or more route paths associated with each intermediate node.

The embodiment further includes instantiating a communication module on the source node, the communication module configured to perform the computing, the receiving, and the sending, where the communication module may communicate with other communication modules to establish and maintain an independent ad hoc network adaptable to changing network conditions. In an embodiment, the routing score can also be based on a magnitude of contiguous node(s) and quality of transmission media.

In one embodiment, these operations (e.g., computing of a routing score and sending of data) may be performed by a communication module instantiated on each of communication devices illustrated by the nodes in the graph of communication devices. In one embodiment, these instantiated communication modules communicate with each other to enable transport of data across the nodes (i.e., communication devices), using alternative communication networks (or frequency spectrums) available to the communication devices, when one or more preferred networking methods (e.g., Internet) utilized by the communication devices have been disrupted or disabled.

In other words, the communication modules instantiated on each of the nodes establish an ad hoc and independent network that can dynamically adapt to changing network conditions. In this way, embodiments enable users to conveniently communicate and network with other users using the ad hoc and independent network established by the communication modules when conventional networks utilized, by the nodes are disrupted or disabled. Furthermore, the ad hoc and independent network established by the communication modules does not use physical cabling to instantiate the network and is therefore not limited by cabling and associated geographical coverage constraints.

While the present embodiments are described herein with reference to illustrative applications, it should be understood that the embodiments are not limited thereto. Those skilled in the art with access to the teachings provided herein will recognize additional modifications, applications, and embodiments within the scope thereof and additional fields in which the embodiments would be of significant utility.

FIG. 1 illustrates a network environment 100 in which embodiments may be implemented. The embodiments are applicable to any environment having generally the structure of FIG. 1, or that would benefit from the operation, methods and functions as described herein.

Network environment 100 includes network 102 and communication devices 110A-N. Communication devices 110A-N can each be any type of computing (or processing) device having one or more processors. For example, communication devices 110A-N can each be a workstation, mobile device, computer, cluster of computers, set-top box, robotic device, appliance or other device having at least one processor. Such a communication device may include software, firmware, hardware, or a combination thereof. Software may include one or more applications and an operating system. Hardware can include, but is not limited to, a processor, memory and graphical user interface display.

In one embodiment, communication devices 110A-N can support email communication and network-based communication. For example, communication devices 110A-N can be mobile phones or tablet computers that support email communication, Internet browsing and/or access to a cloud computing infrastructure. An optional input device, such as a mouse or a Bluetooth headset, may be used. Communication devices 110A-N can be connected to network 102 using a physical wire medium (e.g., cables) or can communicate with network 102 over a wireless medium (e.g., WiFi). Furthermore, communication devices 110A-N can have the ability to communicate over any channel in any frequency spectrum.

Network 102 may include one or more networks, including but not limited to, a local area network, medium-area network, and/or wide-area network, such as the Internet. Network 102, for example, may be any form of wired or wireless network that allows communication devices 110A-N, and any additional clients, servers, systems and appliances to communicate with each other.

Figure 2:
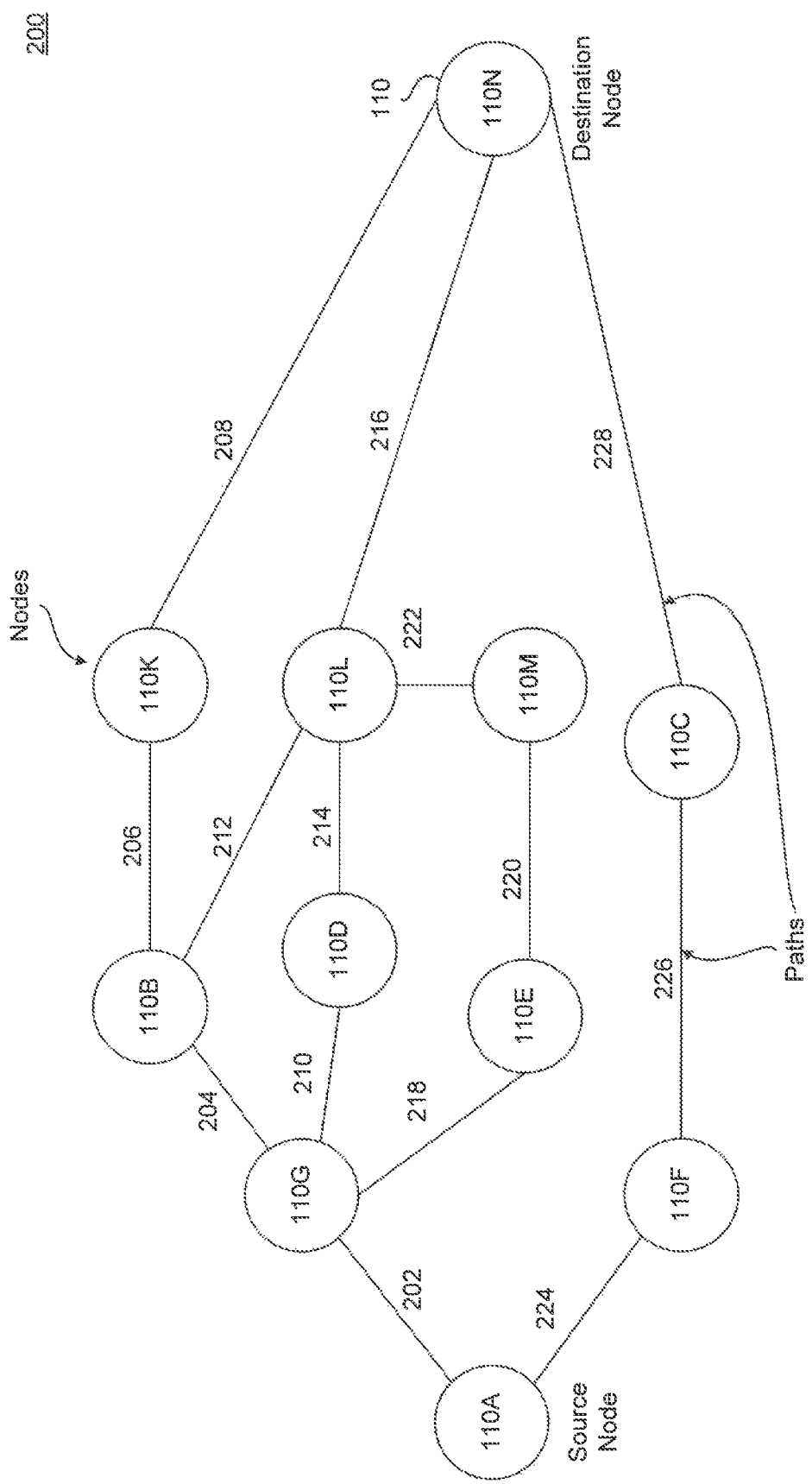
FIG. 2 illustrates a graph that includes nodes representing communication devices.

FIG. 2 is a diagram illustrating a graph 200. Graph 200 includes nodes 110A-N corresponding to communication devices 110A-N. Graph 200 is a graphical representation of communication paths 202-228 that may exist between communication devices 110A-N. Because nodes 110A-N graphically represents communication devices 110A-N, a reference to nodes 110A-N as used herein also indicates reference to corresponding communication devices 110A-N and vice versa. Referring to FIG. 2, node 110A may establish a communication path (or "path") 202 to communicate with node 110G.

In graph 200, node 110A acts as a source node (hereinafter referred to as "source node 110A") and node 110N is a destination node (hereinafter referred to as "destination node 110N"). Referring to FIG. 2, one possible data transport path from source node 110A to destination node 110N can be through paths 202-204-206 and 208, i.e., through nodes 110G, 110B, and 110K. Another possible data transport path from source node 110A to destination node 110N can be through paths 202-218-220-222 and 216 i.e., through nodes 110G, 110E, 110M and 110L. Assuming that node 110G is or becomes disabled or not operational, source node 110A can transport data to destination node 110N along path 224-226-228 i.e., through nodes 110F and 110C.

It is to be appreciated that graph 200 illustrates nodes for the purposes of illustration and not limitation and that any other node in graph 200 may act as a source node or a destination node. In one embodiment, any node in graph 200 acts as a source node when it is sending data and acts as a destination node when receiving data from another node. Reference will be made to graph 200 in discussions below.

Figure 3:
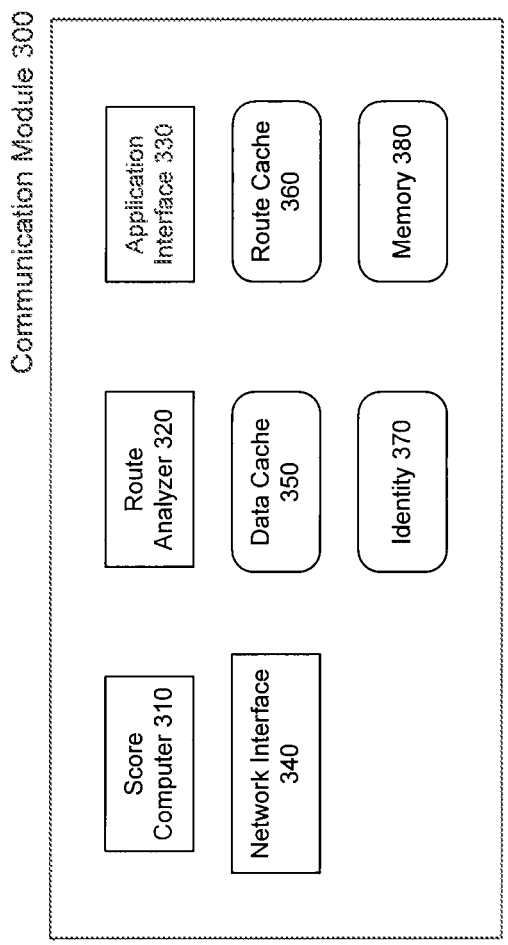
FIG. 3 illustrates a diagram of a communication module.

FIG. 3 illustrates a communication module 300, according to an embodiment. In one embodiment, communication module 300 can be implemented or instantiated on nodes 110A-N. In one embodiment, communication module 300 is implemented as a client module on each of nodes 110A-N. In one embodiment, communication module 300 can be downloaded by respective users of nodes 110A-N.

In one embodiment, communication module(s) 300, instantiated on each of nodes 110A-N, enable transport of data across the nodes (e.g., nodes 110A-N), using alternative communication networks (or frequency spectrums) available to the nodes, when, for example, one or more preferred networking methods (e.g., Internet) utilized by the nodes are disabled or disrupted. In another non-limiting embodiment, communication module(s) 300 enable transport of data across the nodes (e.g., nodes 110A-N), using alternative communication networks (or frequency spectrums) available to the nodes at any time and over any frequency channel.

In one embodiment, and as illustrated in FIG. 3, communication module 300 further includes score computer 310, route analyzer 320, application interface 330, network interface 340, data cache 350, route cache 360, identity 370, and memory 380.

In one embodiment, score computer 310 is configured to compute a routing score for a source node based on at least hardware capabilities of the source node, applications available to the source node (e.g., installed applications), networking capabilities of the source node, a magnitude (or number) of contiguous node(s) and quality of transmission media.

As an illustrative and non-limiting example, a routing score can be a number (or any identifier/value) self-computed (and updated) by each node 110A-N. For example, source node 110A computes a routing score for itself based on at least its hardware capabilities, applications available to (or installed on) itself, and also its networking capabilities.

Hardware capabilities may include computing resources (e.g., processor(s), memory, etc.) available to source node 110A. Networking capabilities include network adapters (e.g., WiFi, Bluetooth adapters) and communication channels that are available to source node 110A. Applications available to the source node (or software capabilities) may include any applications, including, but not limited to, messaging applications and social networking applications.

In one embodiment, source node 110A receives a request to transport data to destination node 110N from a social networking application installed on source node 110A. In another embodiment, source node 110A receives a request to transport data to destination node 110N from a messaging application installed on source node 110A. Because communication module(s) 300 installed on each node 110A-N communicate with each other to enable transport of data across the nodes 110A-N, using any communication networks (or frequency spectrums) available to the nodes, when one or more preferred networking methods (e.g., Internet) utilized by the nodes have been disabled, data transmitted by the social networking and messaging applications installed on source node 110A can still be delivered to destination node 110N.

In other words, communication modules 300 installed on nodes 110A-N establish an ad hoc and independent network that can dynamically adapt to changing network conditions, such as the creation and elimination of available communication channels. In this way, embodiments enable users to conveniently communicate and network with other users using the network established by communication modules 300.

Returning to FIG. 3, In one embodiment, route analyzer 320 determines, using a routing score computed by source node 110A, whether source node 110A has a direct or indirect route to destination node 110N and sends data to destination node 110N based on at least the direct or indirect route, a routing score received from each node in graph 200 and one or more route paths associated with each node in graph 200.

In one embodiment, route analyzer 320 sends a request, based on the routing score, from source node 110A to one or more intermediate nodes directly connected to the source node 110A (e.g., nodes 110F and 110G), to determine whether each intermediate node (i.e., nodes 110F and 110G) has a direct or indirect route to destination node 110N, when source node 110A itself does not have a direct route to destination node 110N.

In this way, route analyzer 320 determines whether intermediate nodes have a route to a destination node, based on receiving a message (e.g., routing score) from each intermediate node indicating whether a direct or indirect route to the destination node exists. Source node 110A then sends the data to the intermediate nodes based on the determining whether the intermediate nodes have a direct or indirect route to destination node 110N. For example, referring to FIG. 2, node 110D may send a message to source node 110A indicating that node 110D has an indirect route (i.e., path 214 and 216) to destination node 110N via node 110L. Node 110K may send a message to source node 110A indicating that node 110K has a direct route (i.e., path 208) to destination node 110N. Other nodes in the graph may transmit similar messages.

Also, in a non-limiting embodiment, once data is sent from source node 110A to an intermediate node, e.g., node 110G, the intermediate node, i.e., node 110G, now acts as a source node for the data. Nodes directly connected to node 110G are nodes 110B, D and E. Thus, nodes 110B, D and E can act as intermediate nodes for any data transmitted by node 110G. In addition, nodes 110B, D and E are also intermediate nodes with respect to source node 11 OA because node 110G is connected to source node 11 OA.

In one embodiment, each node in graph 200 reports its routing score to its respective directly connected intermediate nodes. In another embodiment, each node in graph 200 reports its routing score to any node(s) in graph 200.

In one embodiment, source node 110A (and any other nodes) compute a route path score that is a function of source node 110A's routing score, reported routing scores of any intermediate and destination nodes and also a magnitude (or number) of communication paths available to source node 110A. As a purely illustrative example, the computed route path score can be any number, character, identifier (or any combination thereof) that is based on that is a function of source node 110A's routing score, reported routing scores of any intermediate and destination nodes and also a magnitude (or number) of communication paths available to source node 110A As noted above and In one embodiment, once source node 110A transports the data to an intermediate node (e.g., node 110G), that intermediate node acts as a source node to further transport data to its respective intermediate nodes (e.g., 110B, D and E) for eventual routing to destination node 110N.

In this way, each node along a route path to a destination node can act as a source node and/or intermediate node.

Furthermore, each node in graph 200 has its respective communication module 300 instantiated on itself that enables each node to compute and report its respective routing score as well as transport data to other nodes in graph 200. Thus, communication modules 300 installed on nodes 110A-N establish an ad hoc and independent network that can dynamically adapt to changing network conditions (e.g., network disruption). In this way, embodiments enable users to conveniently communicate and network with other users using the ad hoc and independent network established by communication modules 300.

Returning to FIG. 3, In one embodiment, application interface 330 acts as an application program interface (API) that enables software applications to access capabilities of communication module 300. For example, a messaging application can provide commands to communication module 300 using application interface 330 to transport messages generated by the messaging application to destination node 110N. In a non-limiting embodiment, access to application interface 330 may be provided based on receipt of a unique identifier from an application. Such a unique identifier may be based on a combination of a unique user identifier (ID) (e.g., username) and a unique device ID (e.g., MAC/network address).

In one embodiment, network interface 340 can include any network adapter configured to communicate over one or more wired and/or wireless communication channel(s). In one embodiment, network interface 340 includes hardware that enables a node to connect to network 102. In one embodiment, network interface 340 is associated with a unique media access control (MAC) address that may be used to identify a node in graph 200. MAC addresses are known to those skilled in the art and are unique addresses used to identify network interfaces.

In one embodiment, data cache 350, route cache 360, identity 370 and memory 380 are configured to store data associated with operations of communication module 300 and are described below.

Figure 4:
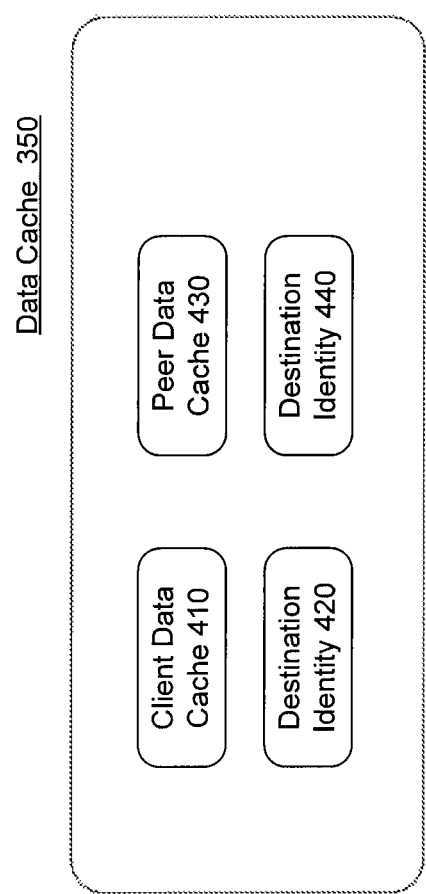
FIG. 4 illustrates a diagram of a data cache.

FIG. 4 illustrates data cache 350, according to an embodiment. Data cache 350 includes client data cache 410, destination identity 420, peer data cache 430 and destination identity 440.

In one embodiment, data cache 350 is used by a node to store data that is pending transmission. This transmission can include a transmission initiated by the node as well as a transmission for which the node is acting as an intermediate node.

In one embodiment, client data cache 410 of a node stores data originating from the node. In one embodiment, peer data cache 430 stores data that is being transported via the node, i.e., transported when the node is acting as an intermediate node.

In one embodiment, both client data cache 410 and peer data cache 430 are associated with their respective destination identities 420 and 440 that store data related to and identifying their respective destination nodes.

Figure 5:
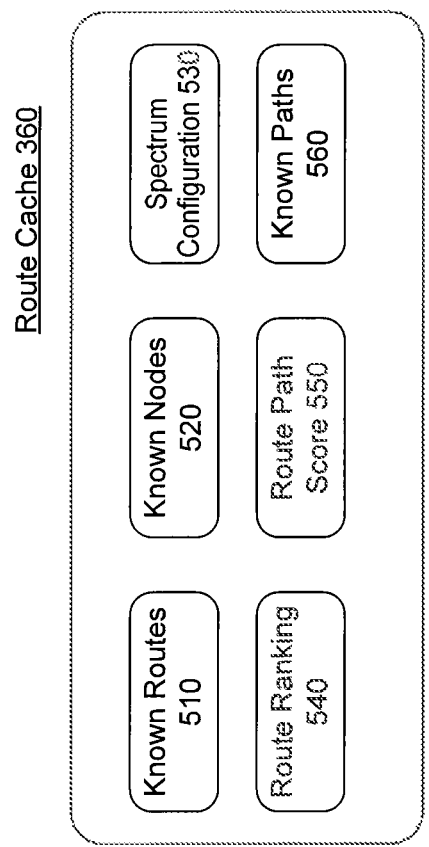
FIG. 5 illustrates a diagram of a route cache.

FIG. 5 illustrates a route cache 360, according to an embodiment. In one embodiment, route cache 360 can store known routes 510, known nodes 520, spectrum configuration 530, route ranking 540, route path score 550 and known paths 560.

In a non-limiting embodiment, route cache 360 is a persistent yet updatable data store that includes information relating to established network routes and their relative transmission quality.

In one embodiment, route cache 360 can dynamically update based on availability of additional network routes or any changes to existing network routes. Such changes can occur, for example, when nodes 110A-N move to different locations. For example, when nodes 110A-N are cellular devices, cell phone networks may change as the devices change locations during a user's travels. Such changes cause communication module 300 to automatically update data stored in route cache 360. In one embodiment, nodes can query route caches of other nodes to determine useful routes.

In one embodiment, known routes 510 includes information relating to established network routes (e.g., the routes from source node 110A to destination node 110N discussed above). Known nodes 520 includes information relating to nodes (e.g., 110G, 110B, 110K) that are known to a given node (e.g., source node 110A).

Spectrum configuration 530 includes data relating to frequency spectrums available to a given node. For example, spectrum configuration 530 can include data relating to frequency channels available to a node, channels of acceptable quality that can be utilized for data transmission and noise levels associated with the channels. In one embodiment, route ranking 540 may include a list of available routes that are ranked based on their availability and quality of transmission media. As an illustrative example, a failed connection on a route may reduce a route rank of the route. For example, referring to FIG. 2, when nodes 110G, 110B, 110K are available and able to provide efficient low-loss data transmission as compared to other nodes in FIG. 2, nodes 110G, 110B, 110K may be ranked higher in route ranking 540 compared to other nodes in FIG. 2. This example is purely illustrative and is not intended to limit the embodiments.

In one embodiment, route path score 550 for a given node can be a function of the node's own routing score, a reported routing score from other nodes associated with the node and a magnitude (or number) of known or possible paths (i.e., known paths 560) to the other nodes from the given node.

Figure 6:
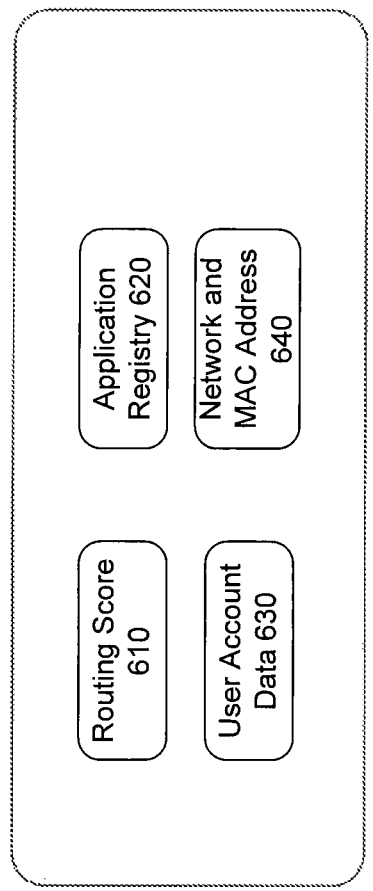
FIG. 6 illustrates a diagram of a node identity.

FIG. 6 illustrates an exemplary identity 370, according to an embodiment. In one embodiment, identity 370 can act as an abstract container (or data store) for one or more attributes and processes used to identify and enable discovery of a given node. In one embodiment, identity 370 further includes routing score 610, application registry 620, user account data 630 and network and MAC address 640.

As discussed above, routing score 610 for a given node is a function of at least hardware capabilities of the node (e.g., source node 110A), applications available to the node, and networking capabilities of the node. In another embodiment, the routing score can also be based a magnitude (or number) of contiguous nodes and quality of transmission media. Also, in one embodiment, routing score 610 can be dynamically updated by communication module 300 based on availability of additional network routes or any changes to existing network routes or nodes.

In one embodiment, application registry 620 for a given node is a dynamic list of applications installed on the node that are capable of interaction with network 102. For example, these applications can be social networking or messaging applications. In one embodiment, these installed applications can communicate with communication module 300 using application interface 330. In one embodiment, application registry 620 is dynamically updated by communication module 300 when applications are installed or uninstalled from a node.

In one embodiment, user account data 630 includes, but is not limited to, data that enables a user to log into the node (or communication device). In other words, and for example, user account data 630 can be a username and password pair used to authenticate and identify a user on network 102.

In one embodiment, network and MAC address 370 for a given node can be used to identify the node, such as by reference to information representing the relationships illustrated in graph 200. As a purely illustrative example, a node may send data to another node using the another node's MAC address. As an example, a MAC address can be a unique hardware identification code associated with network interface 340.

Figure 7:
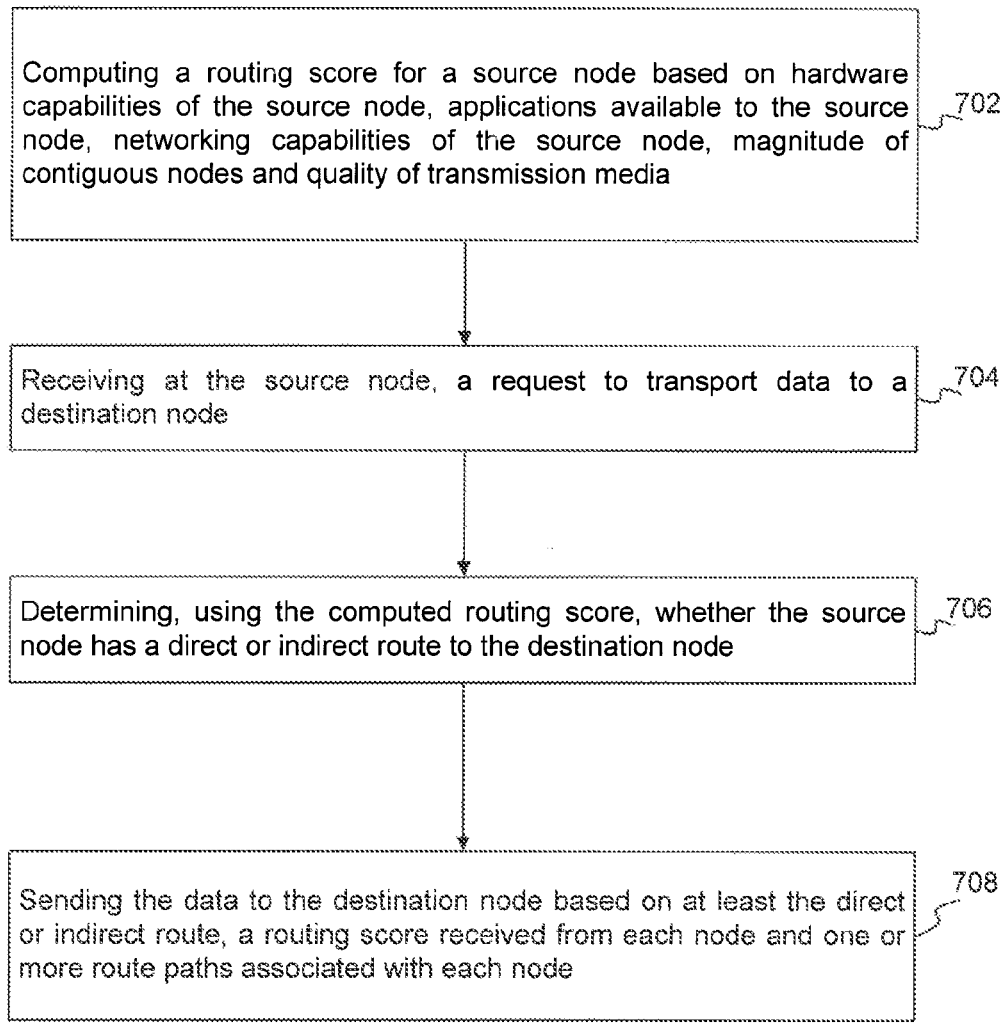
FIG. 7 is a flowchart illustrating overall operation of a communication module.

FIG. 7 illustrates method 700, which is an overall operation of a communication module, according to an embodiment.

In one embodiment, a routing score for a source node is computed, where the routing score is based on one or more of hardware capabilities of the source node, applications (e.g., social networking applications) available to the source node, and networking capabilities of the source node (step 702).

A request to transport data to a destination node, such as a node in the graph of FIG. 2, is received at the source node (step 704). Using the computed routing score, it is determined whether the source node has a direct or indirect route to the destination node (step 706). The data is sent to the destination node based on at least the direct or indirect route, a routing score received from each node and one or more route paths associated with each node (step 708).

As discussed above, and according to an embodiment, steps 702-708 may be performed by communication module 300 instantiated on each node 110A-N.

Figure 8:
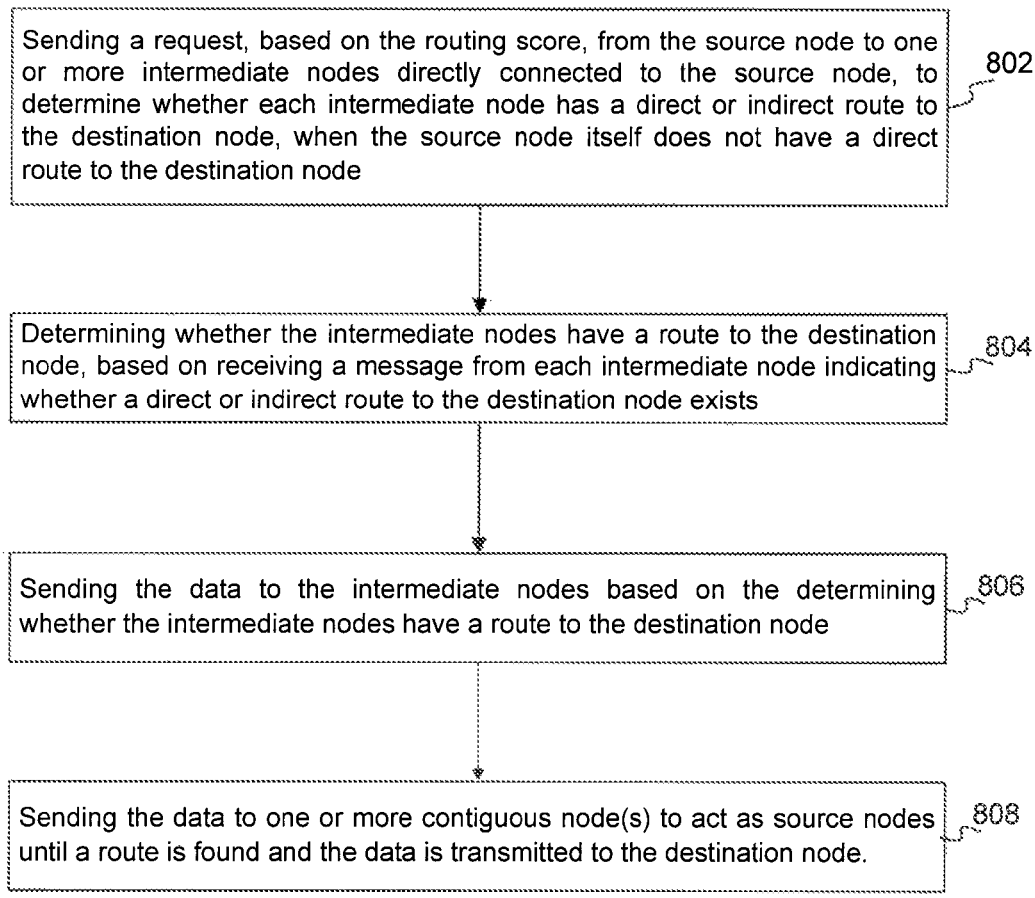
FIG. 8 is a flowchart illustrating sending data to a destination node.

FIG. 8 illustrates method 800, which is an operation of sending data from a source node to a destination node, according to an embodiment.

In one embodiment, a request, based on a routing score, is sent from the source node to one or more intermediate nodes directly connected to the source node, to determine whether each intermediate node has a direct or indirect route to the destination node, when the source node itself does not have a direct route to the destination node (step 802).

Method 800 proceeds by determining whether the intermediate nodes have a route to the destination node, based on receiving a message from each intermediate node indicating whether a direct or indirect route to the destination node exists (step 804). The data is then sent to the intermediate nodes based on the determining whether the intermediate nodes have a route to the destination node (step 806). In a non-limiting embodiment, if no direct or indirect route is found, data is broadcast to appropriate contiguous node(s) to act as source nodes until a route is found and the data is transmitted to the destination node (step 808). For example, source node 110A may send data to other nodes that may be wirelessly available to source node 110A.

Figure 9:
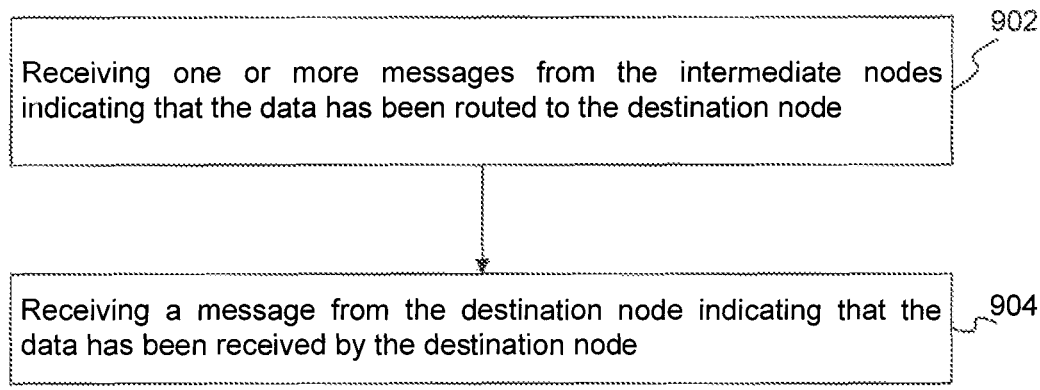
FIG. 9 illustrates receiving messages from intermediate nodes and a destination node.

FIG. 9 illustrates method 900, which is an operation that receives messages from intermediate nodes and a destination node, according to an embodiment.

In one embodiment, one or more messages from the intermediate nodes indicating that the data has been routed to the destination node are received (step 902). When the data is transported to the destination node from the intermediate nodes, a message from the destination node is received indicating that the data has been received by the destination node (step 904).

Figure 10:
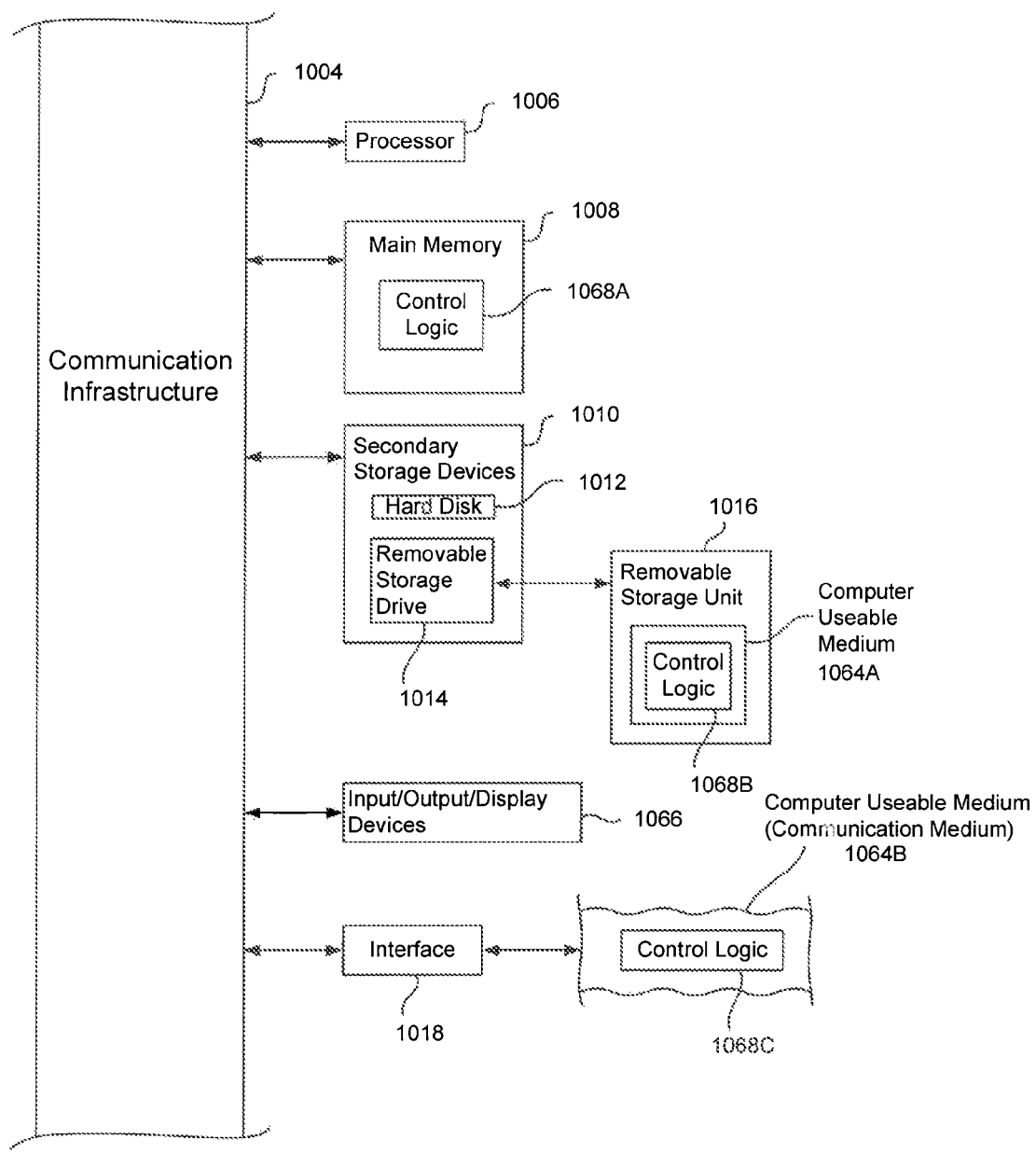
FIG. 10 illustrates an example computer system.

In one embodiment, the system, methods and components of embodiments described herein are implemented using one or more computers, such as example computer 1002 shown in FIG. 10. For example, communication module 300, score computer 310 and route analyzer 320 can be implemented using computer(s) 1002.

Computer 1002 can be any commercially available and well-known computer capable of performing the functions described herein, such as computers available from International Business Machines, Apple, Oracle, HP, Dell, Cray, etc.

Computer 1002 includes one or more processors (also called central processing units, or CPUs), such as a processor 1006. Processor 1006 is connected to a communication infrastructure 1004.

Computer 1002 also includes a main or primary memory 1008, such as random access memory (RAM). Primary memory 1008 has stored therein control logic 1068A (computer software), and data.

Computer 1002 also includes one or more secondary storage devices 1010. Secondary storage devices 1010 include, for example, a hard disk drive 1012 and/or a removable storage device or drive 1014, as well as other types of storage devices, such as memory cards and memory sticks. Removable storage drive 1014 represents a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1064A having stored therein computer software 1068B (control logic) and/or data. Removable storage unit 1016 represents a floppy disk, magnetic tape, compact disk, DVD, optical storage disk, or any other computer data storage device. Removable storage drive 1014 reads from and/or writes to removable storage unit 1016 in a well-known manner.

Computer 1002 also includes input/output/display devices 1066, such as monitors, keyboards, pointing devices, Bluetooth devices, etc.

Computer 1002 farther includes a communication or network interface 1018. Network interface 1018 enables computer 1002 to communicate with remote devices. For example, network interface 1018 allows computer 1002 to communicate over communication networks or mediums 1064B (representing a form of a computer useable or readable medium), such as LANs, WANs, the Internet, etc. Network interface 1018 may interface with remote sites or networks via wired or wireless connections.

Control logic 1068C may be transmitted to and from computer 1002 via communication medium 1064B.

Any tangible apparatus or article of manufacture comprising a computer useable or readable medium having control logic (software) stored therein is referred to herein as a computer program product or program storage device. This includes, but is not limited to, computer 1002, main memory 1008, secondary storage devices 1010 and removable storage unit 1016. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

The Summary and Abstract sections may set forth one or more but not all embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described embodiments, but should be defined only in accordance with the following claims and their equivalents.

What is claimed is:

1. A computer-implemented method, comprising:
    (A) sending a request from a source node to intermediate nodes directly connected to the source node based on the source node not having a direct route to a destination node in order to determine whether the intermediate nodes have a route to the destination node, wherein the source node has no prior knowledge of a route from the source node to the destination node;
    (B) receiving one or more routing scores, at the source node from the intermediate nodes directly connected to the source node, indicating whether a direct route or indirect route to the destination node exists from each intermediate node, wherein a routing score for each intermediate node is based at least on hardware capabilities, available applications, and networking capabilities of each intermediate node;
    (C) identifying a number of route paths from each intermediate node to the destination node based on the received one or more routing scores;
    (D) selecting, by the source node, a particular intermediate node from the intermediate nodes based on the particular intermediate node's associated route path score, wherein the particular intermediate node's route path score is computed based on the particular intermediate node's routing score, one or more reported routing scores from other nodes associated with the particular intermediate node, and the number of identified route paths from the particular intermediate node to the destination node;
    (E) sending, by the source node, data for the destination node to the selected intermediate node; and
    (F) repeating steps (A) to (E) at the selected intermediate node until a route to the destination node is found and the data is transmitted to the destination node, wherein the selected intermediate node becomes a new source node.

2. The method of claim 1, wherein the routing score is based on a magnitude of contiguous nodes and quality of transmission media.

3. The method of claim 1, wherein communication between the source node and the intermediate nodes takes place over one or more types of networks available to the source node and the intermediate nodes.

4. The method of claim 1, further comprising:
    determining availability of one or more processing devices for use by the source node and an intermediate node that is directly connected to the source node;

determining network capabilities of the source node and the intermediate node; and determining a number of other nodes directly connected to the source node and the intermediate node.

5. The method of claim 4, further comprising:

determining reliability of a communication route from the source node to the other nodes and the particular intermediate node, the reliability based on quality of transmission media available to the source node, the other nodes and the particular intermediate node.

6. The method of claim 1, further comprising:

instantiating a communication module on the source node, the communication module configured to perform the sending, receiving, identifying, selecting, sending and repeating, the communication module capable of communicating with other communication modules to establish an ad hoc independent network.

7. A computer-based system, comprising:

a memory; and at least one processor coupled to the memory and configured to:

(A) send a request from a source node to intermediate nodes directly connected to the source node based on the source node not having a direct route to a destination node in order to determine whether the intermediate nodes have a route to the destination node, wherein the source node has no prior knowledge of a route from the source node to the destination node;

(B) receive one or more routing scores, at the source node from the intermediate nodes directly connected to the source node, indicating whether a direct route or indirect route to the destination node exists from each intermediate node, wherein a routing score for each intermediate node is based at least on hardware capabilities, available applications, and networking capabilities of each intermediate node;

(C) identify a number of route paths from each intermediate node to the destination node based on the received one or more routing scores;

(D) select, by the source node, a particular intermediate node from the intermediate nodes based on the particular intermediate node's associated route path score, wherein the particular intermediate node's route path score is computed based on the particular intermediate node's routing score, one or more reported routing scores from other nodes associated with the particular intermediate node, and the number of identified route paths from the particular intermediate node to the destination node;

(E) send, by the source node, data for the destination node to the selected intermediate node; and (F) repeat steps (A) to (E) at the selected intermediate node until a route to the destination node is found and the data is transmitted to the destination node, wherein the selected intermediate node becomes a new source node.

8. The system of claim 7, wherein the routing score is based on a magnitude of contiguous nodes and quality of transmission media.

9. The system of claim 7, wherein communication between the source node and the intermediate nodes takes place over one or more types of networks available to the source node and the intermediate nodes.

10. A computer storage apparatus encoded with a computer program, the program comprising instructions that when executed by data processing apparatus cause the data processing apparatus to perform operations, comprising:

(A) sending a request from a source node to intermediate nodes directly connected to the source node based on the source node not having a direct route to a destination node in order to determine whether the intermediate nodes have one or more routes to the destination node, wherein the source node has no prior knowledge of a route from the source node to the destination node;

(B) receiving one more routing scores, at the source node from the intermediate nodes directly connected to the source node, indicating whether a direct route or indirect route to the destination node exits from each intermediate node, wherein a routing score for each intermediate node is based at least on hardware capabilities, available applications, and networking capabilities of each intermediate node;

(C) identifying a number of route paths from each intermediate node to the destination node based on the received one or more routing scores;

(D) selecting, by the source node, a particular intermediate node from the intermediate nodes based on the particular intermediate node's associated route path score, wherein the particular intermediate node's route path score is computed based on the particular intermediate node's routing score, one or more reported routing scores from other nodes associated with the particular intermediate node, and the number of identified route paths from the particular intermediate node to the destination node;

(E) sending, by the source node, data for the destination node to the selected intermediate node; and (F) repeating steps (A) to (E) at the selected intermediate node until a route to the destination node is found and the data is transmitted to the destination node, wherein the selected intermediate node becomes a new source node.

11. The computer storage apparatus of claim 10, wherein routing score is based on a magnitude of contiguous nodes and quality of transmission media.

* * * * *